March 17, 1964     D. D. STOLTMAN ET AL     3,125,178
VEHICLE ROAD SPEED CONTROL SYSTEM
Filed April 26, 1962
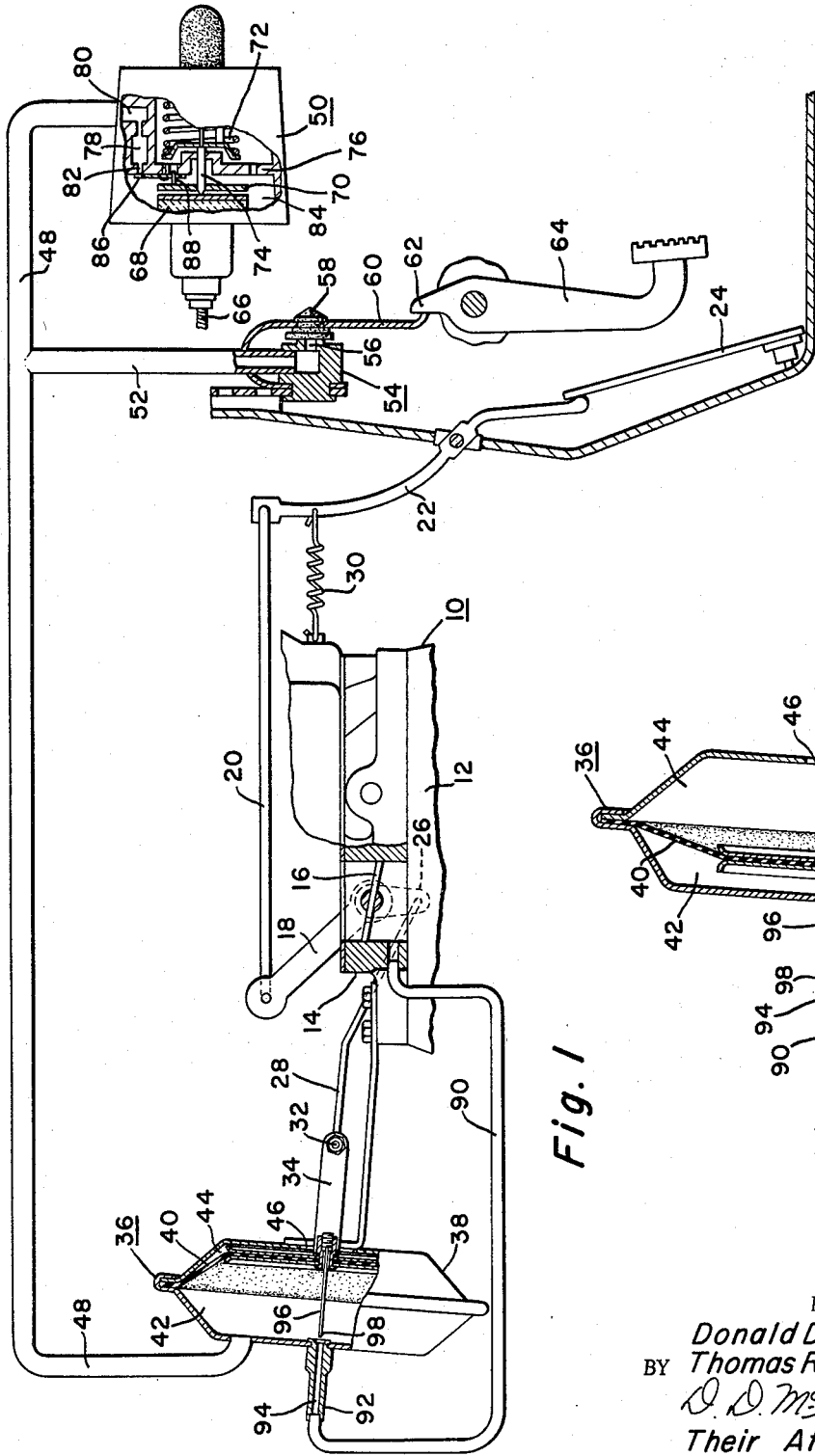
INVENTORS
*Donald D. Stoltman*
BY *Thomas R. Beveridge*
*D. D. McGraw*
*Their Attorney*

United States Patent Office 3,125,178
Patented Mar. 17, 1964

3,125,178
VEHICLE ROAD SPEED CONTROL SYSTEM
Donald D. Stoltman, Henrietta, and Thomas R. Beveridge, Spencerport, N.Y., assignors to General Motors Corporation, Detroit, Mich., a corporation of Delaware
Filed Apr. 26, 1962, Ser. No. 190,429
4 Claims. (Cl. 180—82.1)

The invention relates to a system for controlling the road speed of a vehicle and more particularly to a system wherein modulated control is obtained by a pressure sensitive modulating valve modulating the servo actuating pressure delivered to a servo connected to move the engine throttle. The actuating pressure is preferably engine intake vacuum and the modulating valve is attached to the movable wall of the servo so that it modifies the introduction of engine intake vacuum to the servo control chamber in accordance with movement of the servo movable wall. The vehicle speed is preferably sensed in the same manner as disclosed and described in the copending application Serial No. 115,539, entitled Speed Control System and filed June 7, 1961. The speed sensing mechanism controls an atmospheric bleed valve which modulates the amount of atmospheric air permitted to enter the servo control chamber in accordance with changes of vehicle speed from a set speed. The desired speed is also set in the manner disclosed in the above identified application. Reference is therefore made to that application and the disclosure thereof incorporated as if fully reproduced herein. In its preferred form the intake manifold vacuum modulating valve moved by the servo movable wall is a needle valve extending into a long orifice so that the effective orifice restriction varies as a function of the length of needle extending into the orifice. The valve is connected with the servo movable wall so as to provide a negative feedback to control the engine.

In the drawings:

FIGURE 1 is a schematic presentation of a speed control system embodying the invention and installed on an engine in a vehicle. Parts of the system are illustrated as being broken away and in section.

FIGURE 2 is an enlarged view of the negative feedback modulating valve and part of the servo of FIGURE 2, with parts broken away and in section.

The vehicle engine 10 is provided with an intake manifold 12 to which is connected a carburetor 14 for introducing a suitable fuel-air mixture to the engine under control of throttle valve 16. A throttle link 18 is connected to rotate throttle valve 16 and is actuated through throttle links 20, 22 and accelerator pedal 24. A throttle link 26 is also provided and may be a part of the existing throttle linkage. Servo throttle link control rod 28 is attached to link 26. A throttle return spring 30 is suitably attached to one of the throttle links so that it urges the throttle valve to a normally closed throttle position. Rod 28 is connected through an adjustable connection 32 to the arm 34 of the power servo 36. Servo 36 includes a housing 38 suitably secured to the engine 10 and divided by power diaphragm 40 into a control chamber 42 and an atmospheric pressure chamber 44. The latter chamber is maintained at atmospheric pressure at all times through the opening 46 provided for servo arm 34.

A control conduit 48 is connected with control chamber 42 and to the control head 50. A branch conduit 52 connects conduit 48 to the valve assembly 54 and terminates at an orifice 56 maintained normally closed by the spoiler valve 58. Valve 58 is mounted on a spring 60 urging the valve to the open position but held closed by the detent 62 formed on the brake lever 64. Detent 62 acts through spring 60 to hold valve 58 closed so long as the brake lever 64 is in the vehicle brake release position. When valve 58 is open, atmospheric pressure enters conduit 52 through orifice 56.

The control head 50 senses vehicle speed and has the desired speed set into it in the same manner as does the control head of the above identified application. Control head 50 is therefore only generally described herein, with reference being made to that application for additional details. The drive cable 66 is driven at a speed directly related to vehicle speed to rotate the magnet 68. This in turn rotates the driven disk 70, which is similar to the speed cup of a magnetic speedometer, against the torsional force of the speed set spring 72. Spring 72 is secured to the disk shaft 74 and is rotatably supported through wall 76 formed in the housing of the control head. A chamber 78 also formed in the control head housing is connected to a passage 80 to which conduit 48 is connected. An orifice 82 is formed through wall 76 and connects the chamber 84 in which disk 70 is located with the chamber 78. Chamber 84 is suitably connected to atmosphere. A flat valve 86 is pivotally secured to the flat surface of wall 76 adjacent disk 70 so that one end of the valve can cover and uncover in varying degrees the orifice 82. Valve 86 is preferably made of Mylar, a polyester resin which is the reaction product of terephthalic acid and ethylene glycol. This type of material is preferred due to its physical characteristics of strength and weight and low coefficient of friction. It is obvious that other suitable materials may be used. A pin 88 secured to disk 70 engages valve 86 so that rotating movement of disk 70 results in pivotal movement of valve 86 to control orifice 82. When the vehicle speed is zero valve 86 completely uncovers orifice 82. As the vehicle speed increases and approaches the set speed, disk 70 is rotated so that its pin 88 pivots valve 86. Valve 86 then begins to close orifice 82. As the speed further increases orifice 82 is entirely closed and the valve begins to move beyond the orifice. The orifice is then opened a controlled amount depending upon further movement of valve 86.

A conduit 90 connects the engine intake manifold with an extended nipple 92 secured to servo housing 38 adjacent chamber 42. A long orifice 94 is formed through nipple 92 and is in communication with chamber 42 and conduit 90. A needle valve 96 is secured to diaphragm 40 so that it extends within chamber 42. When chamber 42 is fully expanded, this being the diaphragm position with the throttle valve at zero throttle, the outer end 98 of needle 96 is at the end of orifice 94 opening into chamber 42. As diaphragm 40 is moved to the left needle 96 extends a proportionate distance into orifice 94. The effective length of the restriction formed by orifice 94 and needle 96 varies the restrictive effect of the orifice. Thus as diaphragm 40 moves, the intake manifold vacuum impressed on chamber 42 is modulated to provide negative feedback.

Assuming the vehicle to be at a speed well below the set speed, disk 70 is positioned by spring 72 so that valve 86 completely uncovers orifice 82. Air under atmospheric pressure is therefore imposed on chamber 78 and through condut 48 on control chamber 42. If the engine throttle valve 16 is in the engine idle position, diaphragm 40 is positioned to the right as shown in FIGURE 1. The restrictive effect of the open orifice 94 does not permit a sufficient reduction in pressure in chamber 42 to move diaphragm 40 to the left against the force of spring 30 since virtually unrestricted atmospheric pressure is permitted to enter chamber 42 through conduit 48. As the vehicle speed increases the magnetic attraction acting on disk 70 rotates it against the torsional force of spring 72 so that valve 86 pivots to close orifice 82. This closes off the atmospheric inlet contol chamber 42 and the intake manifold vacuum evacuates that chamber through orifice 94. This moves diaphragm 40 to the left so that it opens the throttle valve 16 or assumes the position of the partially open throttle valve. The throttle valve is obviously partially open at this time since the vehicle is increasing speed under engine power. The movement of diaphragm 40 further opens throttle valve 16, tending to accelerate the vehicle. The resulting increase in vehicle speed acts through the speed sensing unit of control head 50 so that valve 86 begins to open orifice 82. This allows a controlled atmospheric bleed into the control chamber 42 through orifice 94. Since diaphragm 40 has moved to the left needle 96 extends into orifice 94, causing a greater orifice restriction. It can be seen that the further to the left diaphragm 40 moves to open throttle valve 16, the greater the restriction to the entry of vacuum from conduit 90 into chamber 42. A negative feedback effect is thus obtained.

If the vehicle increases above the set speed, valve 86 continues its pivotal movement to further open orifice 82, causing an increase in absolute pressure in chamber 42 and allowing diaphragm 40 to move to the right under influence of throttle closing spring 30. Throttle valve 16 is also moved toward the throttle closing position, decreasing the vehicle speed and obtaining a new balance situation between the opening of orifice 82, the throttle valve position, and the restrictive effect of orifice 94, to provide a reduced pressure in chamber 42 tending to hold the vehicle at the set speed.

If at any time during the speed controlling condition of operation the vehicle operator desires to disengage the unit, he moves the brake lever 64 to begin actuation of the vehicle brakes. This opens spoiler valve 58 and allows relatively unrestricted atmospheric pressure to enter conduit 48 and control chamber 42. Throttle closing spring 30 then moves the throttle linkage to the throttle closing position since diaphragm 40 no longer resists the spring. The vehicle speed decreases and the speed sensing unit in control head 50 moves valve 86 across orifice 82 so that the orifice is completely opened.

We claim:

1. A vehicle speed and load-demand responsive control system for a vehicle engine having a throttle valve and an intake manifold controlled by the throttle valve, said control system comprising, a servo having a movable wall connectible to said throttle valve for actuation thereof, first conduit means for connecting the engine intake manifold to said servo to provide engine intake manifold vacuum thereto for powering said servo, second conduit means having vehicle speed sensitive means therein and connected with said servo, said vehicle speed sensitive means acting through said second conduit means to modify vacuum acting on said servo movable wall in accordance with vehicle speed, and variable restriction valve means in said first conduit means having a movable element operatively connected with said servo movable wall to increasingly and decreasingly restrict delivery of vacuum to said servo from said first conduit means in direct relationship to manifold vacuum variations reflecting changing load-demand and resulting from opening and closing movement of the throttle valve under control of said servo.

2. The control system of claim 1, said variable restriction valve means comprising a long orifice and said movable element of said valve means being a needle variably extendible into said orifice to vary the effective orifice length and provide a variable restriction.

3. In a system for controlling the throttle valve of an internal combustion engine having intake manifold in which a variable pressure is generated under control of said throttle valve, a servomotor having a housing with a movable wall mounted therein and a chamber with said movable wall forming one wall thereof, linkage means for connecting said movable wall to the throttle valve, conduit means for interconnecting said servomotor chamber and the intake manifold, controllable bleed means for said servomotor chamber, and variable restriction valve means at the connection of said conduit means with said servomotor chamber and having a static element and a restriction controlling movable element connected with said servomotor movable wall to vary the valve means restriction in relation to the distance of said movable wall from said static element whereby the pressure transmitted to said servomotor chamber from the intake manifold is modified in relation to movement of the throttle valve by said servomotor movable wall.

4. The system of claim 3, said variable restriction valve means comprising a long orifice as said static element and a needle as said restriction controlling movable element, said needle being movable in said orifice by said movable wall to vary the effective length and therefore the restrictive effect of said valve means.

References Cited in the file of this patent
UNITED STATES PATENTS

| | | |
|---|---|---|
| 2,367,606 | Olson | Jan. 16, 1945 |
| 2,372,274 | Hoppe | Mar. 27, 1945 |
| 2,782,025 | Olson | Feb. 19, 1957 |
| 2,989,950 | Lockman | June 27, 1961 |
| 3,068,849 | Thorner | Dec. 18, 1962 |